United States Patent
Xu et al.

(10) Patent No.: US 11,808,474 B2
(45) Date of Patent: Nov. 7, 2023

(54) THERMOSTAT FOR CONVEYING EXPECTED THERMAL RESPONSES TO USERS

(71) Applicant: Universal Electronics Inc., Scottsdale, AZ (US)

(72) Inventors: Rex Xu, Foothill Ranch, CA (US); Dai Tanaka, Irvine, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 250 days.

(21) Appl. No.: 17/072,553

(22) Filed: Oct. 16, 2020

(65) Prior Publication Data

US 2022/0120464 A1   Apr. 21, 2022

(51) Int. Cl.
| | |
|---|---|
| F24F 11/64 | (2018.01) |
| F24F 11/46 | (2018.01) |
| F24F 11/523 | (2018.01) |
| F24F 110/10 | (2018.01) |
| G05D 23/19 | (2006.01) |
| F24F 11/52 | (2018.01) |

(52) U.S. Cl.
CPC .............. *F24F 11/64* (2018.01); *F24F 11/46* (2018.01); *F24F 11/523* (2018.01); *F24F 2110/10* (2018.01)

(58) Field of Classification Search
CPC .......... F24F 11/64; F24F 11/46; F24F 11/523; F24F 2110/10; F24F 11/52; Y02E 20/32; G05D 23/1928
See application file for complete search history.

(56) References Cited

U.S. PATENT DOCUMENTS

| | | | |
|---|---|---|---|
| 2011/0035061 A1 | 2/2011 | Altonen et al. | |
| 2012/0016524 A1* | 1/2012 | Spicer | G05B 15/02 |
| | | | 700/276 |
| 2013/0345882 A1 | 12/2013 | Dushane et al. | |
| 2014/0163746 A1* | 6/2014 | Drew | F24F 11/52 |
| | | | 700/276 |
| 2014/0277795 A1 | 9/2014 | Matsuoka et al. | |
| 2014/0316581 A1* | 10/2014 | Fadell | F24F 11/30 |
| | | | 700/276 |
| 2016/0040902 A1* | 2/2016 | Shah | F24F 11/52 |
| | | | 700/277 |
| 2016/0170626 A1 | 6/2016 | Fadell et al. | |
| 2017/0242411 A1 | 8/2017 | Papadopoulos | |
| 2018/0266718 A1* | 9/2018 | Gillette | F24F 11/64 |
| 2019/0154873 A1* | 5/2019 | Mitterhofer | G01W 1/00 |
| 2020/0132328 A1* | 4/2020 | Boettcher | H02J 3/14 |

FOREIGN PATENT DOCUMENTS

JP    2006290244 A   * 10/2006

OTHER PUBLICATIONS

ISA/US, Int. Search Report and Written Opinion issued on PCT application No. PCT/US21/54378, dated Jan. 14, 2022, 28 pgs.

\* cited by examiner

*Primary Examiner* — Thomas C Lee
*Assistant Examiner* — Anzuman Sharmin
(74) *Attorney, Agent, or Firm* — Greenberg Traurig, LLP

(57) ABSTRACT

A method and apparatus for summarizing and conveying expected thermal responses is described. Expected thermal responses of a room or an entire structure are calculated based on thermostat setpoints. The expected thermal responses are summarized into an expected thermal response visualization and displayed to a user for easy understanding of current, and future, temperature expectations before or as a room or entire structure is heated or cooled.

10 Claims, 8 Drawing Sheets

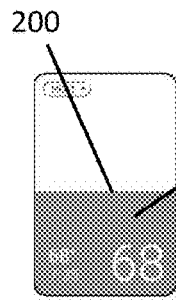 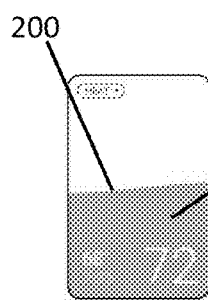 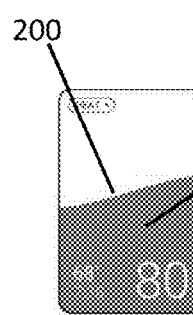 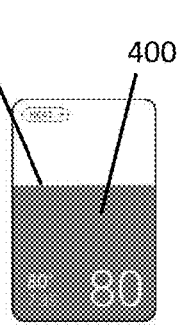
FIG. 4A     FIG. 4B     FIG. 4C     FIG. 4D
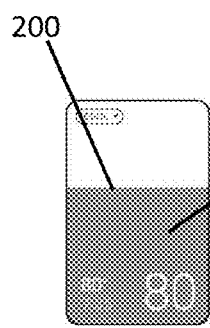 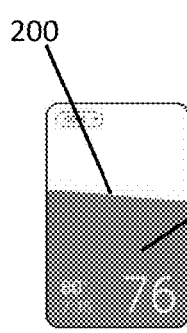 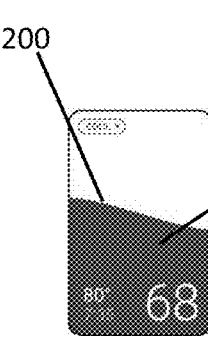 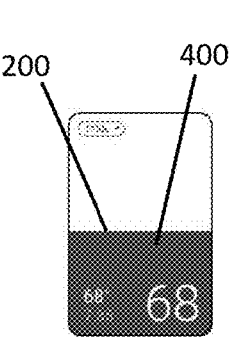
FIG. 4E     FIG. 4F     FIG. 4G     FIG. 4H

FIG. 6

600 - Program Thermostat
602 - Receive Current Weather Conditions
604 - Receive Future Weather Forecasts
606 - Calculate Expected Thermal Response(s)
608 - Suggest User Action(s)
610 - Receive Response - Recalculate Expected Thermal Response(s)
612 - Generate/Send Blind Control Signal(s) - Recalculate Expected Thermal Response(s)
614 - Calculate/Modify Expected Thermal Response(s) based on Mode of Operation
616 - Simplify Expected Thermal Response - Form Expected Thermal Response Visualization(s)
618 - Display Expected Thermal Response Visualization(s)
620 - Display Indicator

THERMOSTAT FOR CONVEYING EXPECTED THERMAL RESPONSES TO USERS

BACKGROUND

I. Field of Use

The present application relates generally to the heating, ventilation and air conditioning arts. More specifically, embodiments of the present invention relate to methods and apparatus for calculating, summarizing and displaying HVAC-related information.

II. Description of the Related Art

Thermostats are used to control heating, ventilation, and air conditioning (HVAC) equipment, such as central air conditioners and central heaters, to adjust room temperatures to desired user settings. With the advancement of computer technology, thermostats have evolved over the years, allowing users to maximize energy conservation by turning HVAC systems off when heating or cooling is not needed, such as during the day when everyone is at work or school, or at night, when everyone is sleeping. This is achieved by programming thermostats with "setpoints", which are combinations of desired temperatures in association with certain times to achieve the desired temperatures. Some modern thermostats may be programmed with as many as four setpoints per day, for example, a "wake" setpoint, comprising a desired temperature and a time that the desired temperature should be achieved when members of a household generally wake up in the morning, a "leave" setpoint, i.e., a desired temperature and a time when the dwelling is unoccupied during day hours, a "return" setpoint, i.e., a desired temperature and time when occupants are expected to return from work or school, and a "sleep" setpoint, i.e., a desired temperature and time when occupants are expected to go to bed.

Thermostats typically control heating and/or cooling equipment by turning HVAC equipment on or off and sometimes can control whether an HVAC system fan is operating at high, low or medium speed. For example, when a room temperature where a thermostat is located drops below a setpoint in a heating mode, the thermostat sends a signal to HVAC equipment to begin heating the room. When the setpoint has been achieved or exceeded, the thermostat sends another signal to the HVAC equipment to turn off.

Today's thermostats rely on numbers as the primary indication of system operation and user input. However, numbers cannot visually indicate expected thermal responses, such as how current room temperatures are expected to change over time before or when the HVAC is actively heating or cooling, or how quickly changes in temperature will occur given a current temperature and setpoint. For example, if the user feels too warm, does the thermostat need to be adjusted lower or is the system already cooling and it just takes some time? A number alone is also not enough to represent the energy required to reach the set point, missing an opportunity to encourage energy conservation.

It would be desirable for thermostats to better convey certain past, present and future HVAC-related information to users, to provide users with an easy-to-understand user interface, especially for understanding expected thermal responses and HVAC system performance and to encourage energy conservation.

SUMMARY

Embodiments of the present invention are directed towards a method and apparatus for summarizing and conveying expected thermal responses. In one embodiment, an apparatus is described, comprising a graphical user interface, a temperature sensor, a non-transient memory for storing processor-executable instructions and one or more setpoints, and a processor, coupled to the graphical user interface, the temperature sensor and the non-transient memory for executing the processor-executable instructions that causes the processor to store a first setpoint in the memory, the first setpoint comprising a start time and a desired setpoint temperature, determine an ambient temper of a room based on one or more signals from the temperature sensor, calculate an expected thermal response based on at least the ambient temperature and the desired setpoint temperature, summarize the expected thermal response into an expected thermal response visualization, and cause the expected thermal response visualization to be displayed on the graphical user interface.

In another embodiment, a method is described, comprising storing a first setpoint in a memory, the first setpoint comprising a start time and a desired setpoint temperature, determining an ambient temper of a room based on one or more signals from a temperature sensor, calculating an expected thermal response based on at least the ambient temperature and the desired setpoint temperature, summarizing the expected thermal response into an expected thermal response visualization, and causing the expected thermal response visualization to be displayed on the graphical user interface.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIGS. 4A-4D illustrate a front plan view of one embodiment of the thermostat as shown in FIGS. 1, 2 and 3, illustrating the use of color to convey certain expected energy consumption rate information of a heating system;

FIGS. 4E-4H illustrate a front plan view of one embodiment of the thermostat as shown in FIGS. 1, 2 and 3, illustrating the use of color to convey certain expected energy consumption rate information of a cooling system;

FIG. 6 is a flow diagram of one embodiment of a method, performed by the thermostat as shown in FIGS. 1, 2 and 3, 4A-H, and 5, for calculating, summarizing and presenting expected thermal response visualizations;

DETAILED DESCRIPTION

Embodiments of the present invention are directed towards an improved thermostat for calculating, summarizing and conveying expected thermal responses. As used herein, an "expected thermal response" comprises expected temperatures of ambient air inside a structure over time, and/or an expected energy consumption of HVAC equipment during heating and cooling cycles. The improved thermostat features a processor that calculates expected thermal responses, summarizes the expected thermal responses, for example, in a graphical format, and then displays an expected thermal response graph on a graphical user interface. The expected thermal response graph, or "visualization" as sometimes referred to herein, comprises one or more graphs and, in some embodiments, one or more different colors to convey this information. In one embodiment, an expected thermal response comprises expected air temperatures over time in an area controlled by a thermostat, as a heating system or a cooling system is actively heating or cooling a room or structure, respectively. It may also refer to expected temperatures in a room or structure when a heating or cooling system is not actively heating or cooling a room.

Expected thermal response may be calculated at any time prior to reaching a setpoint start time and, in some embodiments, additionally calculated in response to a user manually entering a desired temperature.

The advantages of a thermostat that calculates, summarizes and displays expected thermal responses in a graphical format are that it makes it easy for people to instantly understand the effectiveness of their heating and cooling systems, to know that a heating or cooling cycle is underway, and, in some embodiment, where, in time, a heating or cooling cycle happens to be.

Figure 1:
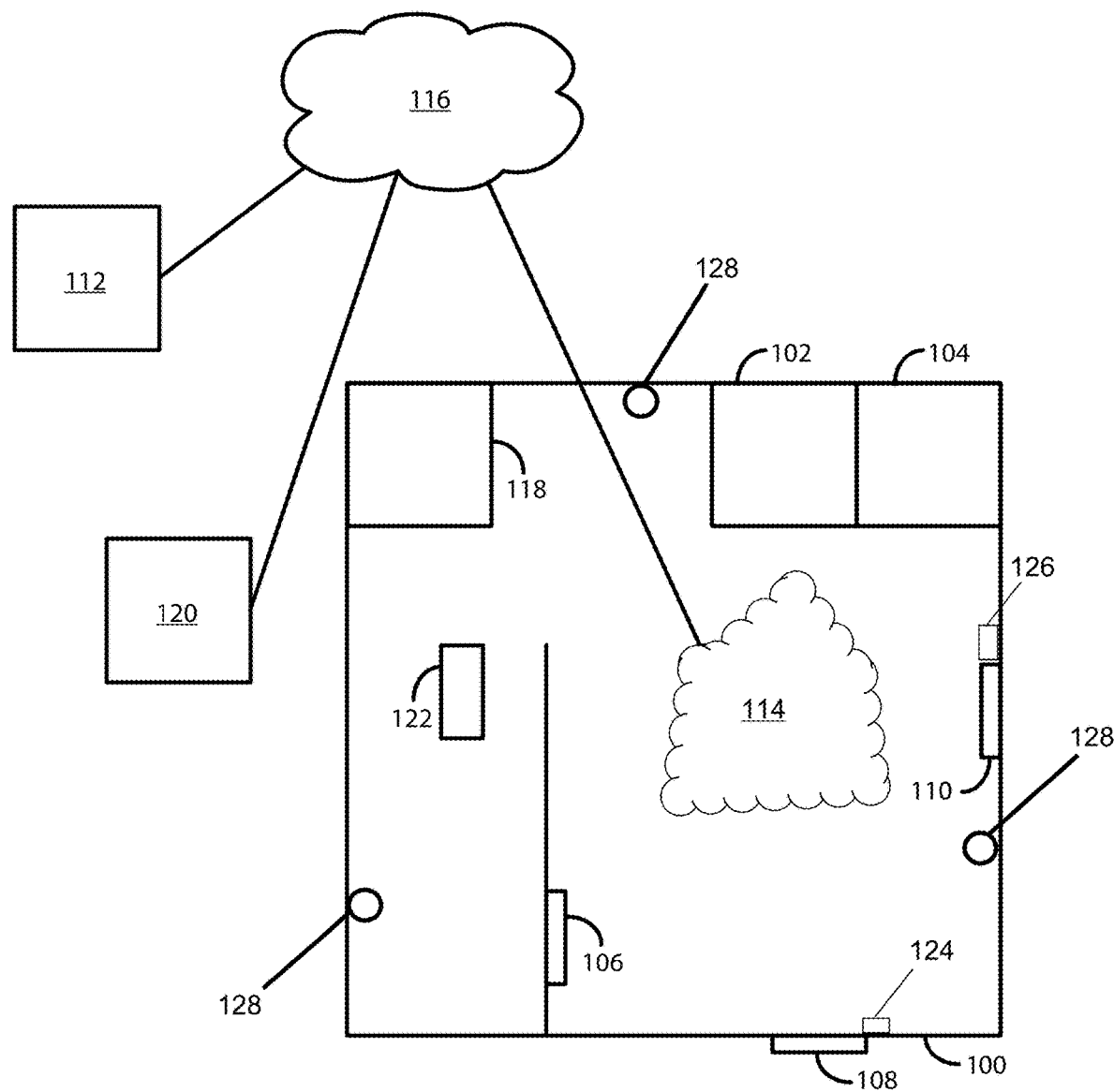
FIG. 1 is a top, plan view of a structure utilizing the inventive concepts discussed herein.

FIG. 1 is a top, plan view of a structure 100 utilizing the inventive concepts discussed herein. In this embodiment, structure 100 comprises a multi-room, single-story residence having a heating system 102, a cooling system 104 and a thermostat 106 that controls heating system 102 and cooling system 104. Structure 100 also comprises at least one entry door 108 and one window 110 that may be monitored by a security system comprising central "hub", security panel, or gateway 118, security sensors, such as a door sensor 124 and a window sensor 126. In one embodiment, hub 118 additionally provides home automation functionality, such as automatically turning lights on and off as people enter and leave structure 100. In this embodiment, hub 118 receives wireless signals from one or more occupancy sensors, shown in FIG. 1 as having three of such sensors 128. While only 3 sensors 128 are shown in FIG. 1, in other applications, a fewer, or a greater, number of sensors may be used, and the sensors do not have to be all of the same type. For example, a first sensor 128 could be an occupancy or motion sensor that operates based on movement, and a second sensor 128 could be a carbon dioxide detector that detects the level of carbon dioxide in the ambient air and reports the level to hub 118. Hub 118, in turn, can automatically, for example, turn a light on in a room where a sensor 128 detected movement or an increase in carbon dioxide leaves, as well as automatically turn the light off when movement is no longer detected, or carbon dioxide levels decrease. In one embodiment, Each of the door sensor 124, the window sensor 126 and sensors 128 typically comprise standard, wireless, prior art sensors, such as door and window security sensors, motion detectors, occupancy sensors, carbon dioxide sensors and cameras. In one embodiment, thermostat 106 uses one or more signals from these sensors to calculate, or modify, expected thermal responses. The signals may be received via one or more wireless receivers within thermostat 106, such as receivers that utilize well-known wireless protocols such as Zwave®, Zigbee®, Wi-Fi, professional security protocols (such as those used by Honeywell®, 2Gig® and Tyco/DSC), Wi-Fi, and others. Thermostat 106 comprises a temperature sensor 508 that senses the ambient temperature of the room where thermostat 106 is located. In some embodiments, thermostat may be configured to receive two or more temperature sensor inputs from temperature sensors located in other parts of structure 100.

Like prior art thermostats, thermostat 106 may be programmed with one or more "setpoints" in the form of desired temperatures and times when the desired temperatures should be achieved. For example, a user may program thermostat 106 with several setpoints. As examples: a "wake" setpoint to warm a room to 74 degrees Fahrenheit at 7 am when the user typically wakes, a "leave" setpoint to maintain a temperature of no less than 62 degrees at 8:30 am when the user leaves structure 100 to go to work, a "return" setpoint to set the room temperature to 74 degrees Fahrenheit at 6 pm when the user typically returns from work, and a "retire" setpoint to maintain a room temperature of no less than 60 degrees Fahrenheit at 10 pm when the user typically goes to bed. As each of the times set by the user in the setpoint near, thermostat 106 sends signals to heating system 102 or cooling system 104 to begin or stop heating or cooling, depending on the current ambient air temperature measured by thermostat 106 (and/or one or more external temperature sensors) and the desired setpoint temperature.

The term "setpoint" may additionally be used to describe a desired temperature setting entered by a user manually, in order to change the ambient air temperature to the temperature entered by the user.

To achieve the temperature setpoints at the times specified in the setpoint, thermostat 106 typically begins heating or cooling before the setpoint time for each setpoint. In this way, the desired room temperature is often achieved by the time the setpoint time is reached. This is known in the art as "thermal ramping" or simply, "ramping". Prior art thermostats may be pre-programmed to begin ramping a predetermined, fixed time period before each setpoint time, such as 15 minutes or 30 minutes. In some embodiments, thermostat 106 may alter the start time of such ramping, as described by U.S. patent application Ser. No. 15/859,573, assigned to the assignee of the present applicant and incorporated by reference herein.

Thermostat 106 predicts the ambient air temperature during heating and cooling cycles, including any ramping that may occur, for future setpoints, based on a current or expected ambient temperature of an area within structure 100 and on the desired setpoint temperature of each setpoint. In one embodiment, thermostat 106 calculates a number of expected temperatures vs. time during heating and cooling cycles, and then simplifies and formats the expected temperatures into a graphical format for display on thermostat 106 and/or on some other device, such as mobile device 122. Further, thermostat may calculate an expected energy consumption rate by heating system 102 or cooling system 104 during a current or future heating or cooling cycles.

Expected thermal responses may be calculated using one or more factors, such as the ambient temperature in an area of structure 100 monitored by thermostat 106, each desired setpoint temperature, a capacity of heating system 102 and cooling system 104, current or future outdoor temperatures, results from previous heating and cooling cycles, and door and window status (i.e., whether one or more doors or windows are open or closed), as will be discussed later herein. After an expected thermal response is calculated, is generally summarized by formatting it into an expected thermal response visualization and then displaying the expected thermal response visualization on a graphical user interface on thermostat 106 and/or one or more other devices, such as mobile device 122, a television screen, a local or remote computer, etc.

Figure 2:
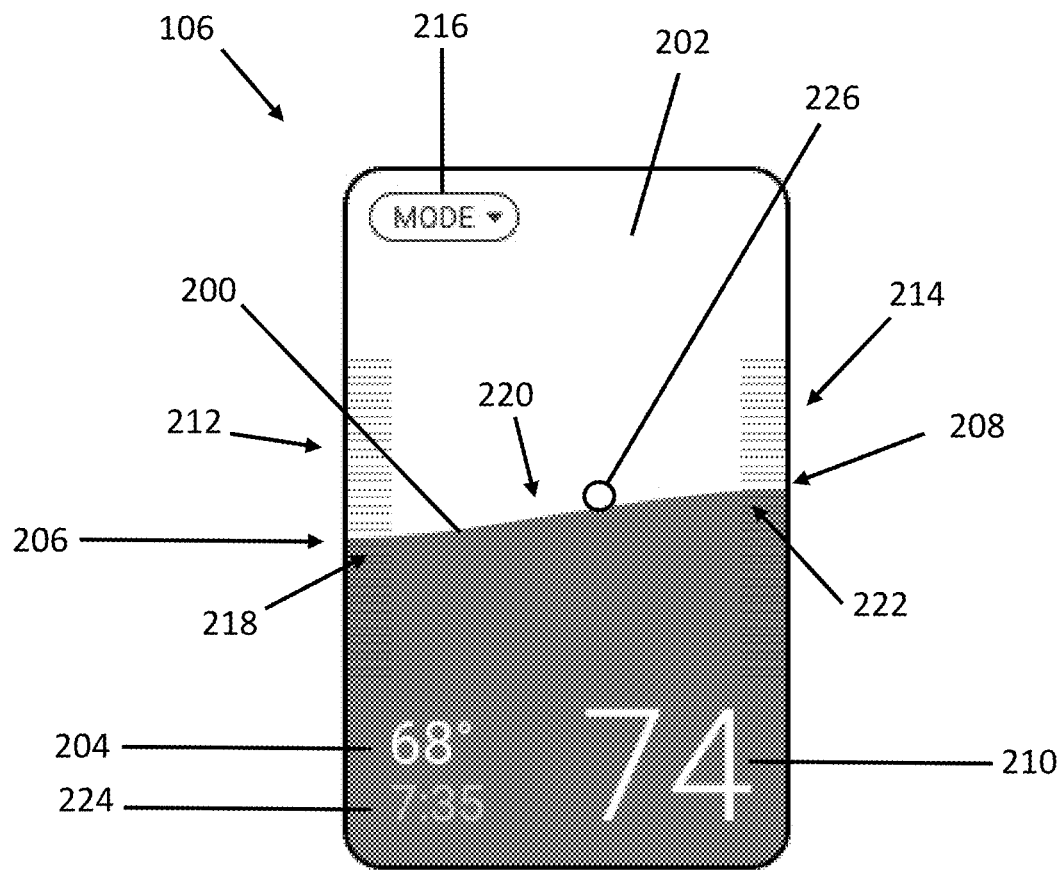
FIG. 2 is a perspective view of one embodiment of a thermostat as shown in FIG. 1, showing a wave curve during a heating cycle.

In one embodiment, expected thermal response visualizations comprise a "wave curve" or a line graph that graphically illustrates expected temperatures vs. time during an upcoming or current heating or cooling cycle, or times in between such cycles (i.e., when heating system 102 and/or cooling system 104 is/are dormant). Generally, a wave curve comprises a short, gently-sloped, beginning portion followed by a steeper-sloped middle portion and a short, gently-sloped end portion, as shown in FIG. 2. The wave curve may also be flat or slightly sloped (i.e., generally a linear increase or decrease in temperature as an area inside structure 100 heats up or cools down under ambient conditions) during times of steady state operation, i.e., when an ambient temperature is equal to a desired setpoint temperature and neither heating system 102 nor cooling system 104 is active.

In one embodiment, thermostat 106 is coupled to weather server 112 via a local area network (LAN) 114, such as a home Wi-Fi router and modem, and a wide-area network 116, such as the Internet. Thermostat 106 may be provided with current and future weather information in a geographic area where structure 100 is located. Such future current and future weather information may comprise a current outdoor temperature and humidity, future outdoor temperature forecasts, precipitation conditions and predictions, current and expected wind speed and direction, current and expected cloud coverage, and other current and future weather-related information. Thermostat 106 may be programmed by a user with information pertaining to the thermostat's location, typically by entry of a city and state, or the location may be determined by the weather server 112 based on an IP address assigned to thermostat 106. In any case, weather server 112 provides current and future weather information to thermostat 106 upon request from thermostat 106, for example at predetermined time intervals, or on a "push" basis as updates become available from weather server 112.

In one embodiment, thermostat 106 uses future weather information in conjunction with past heating and cooling cycle information to determine expected thermal responses. Thermostat 106 may store previous heating and cooling information, such as setpoints, heat/cool ramp start times, resultant room temperature(s) and outdoor temperature information during the ramps to determine a relationship between room temperatures, outdoor temperatures, desired room temperatures and the time it takes to ramp to such desired room temperatures. This is explained in greater detail later herein.

In another embodiment, thermostat 106 may utilize current and future weather information, and/or past heating and cooling cycle information, and/or door and/or window status information to determine expected thermal responses. In this embodiment, a status of one or more doors and/or windows is provided to thermostat 106, either directly via wireless sensors that monitor doors or windows in structure 100, or via hub 118. The status of each door or window comprises either "open" or "closed". In some embodiments, an amount that a door or a window is open may also be provided, such as "18 inches", or "3 feet, 6 inches" in embodiments where such detailed status information is provided by the sensors. Thermostat 106 may record resultant room temperatures during thermal ramping and additionally record the status of one or more doors or windows. Such door and/or window status information may skew the time needed to achieve setpoints. For example, if the outdoor temperature is 30 degrees, and the indoor room temperature is 60 degrees, and a desired room temperature at 7 am is 72 degrees, a standard ramp time may be determined to be 40 minutes. However, if a window is open, cold air from outside will enter through the open window and hamper the heating system's effort to bring the room to the desired temperature within the standard 40 minute ramp time. In this case, thermostat 106 tracks the room temperature during the ramp, and stores certain parameters from the ramp, such as how long it actually took to achieve the desired temperature, based on the outdoor temperature, the starting room temperature, the desired room temperature, a plurality of temperatures vs. time during the ramp, and the fact that one window was open. Then, the next time that similar circumstances present, i.e., the same or similar outdoor temperature, one window open, starting room temperature, and desired room temperature, thermostat 106 may alter the ramp time, increasing it to 50 minutes, in order to achieve the desired room temperature at the desired setpoint time.

In one embodiment, the calculations performed by thermostat 106 to determine expected thermal responses may be performed by some other apparatus or system, such as server 120. Server 120 comprises a computer server in the cloud and is coupled to thermostat 106 via wide-area network 116 and local-area network 114. Server 120 receives certain information from thermostat 106, such as current room temperatures, previously stored setpoints, setpoint information, previously-stored thermal responses, occupancy information, door/window status information, etc. for use in calculating expected thermal responses and providing such expected thermal responses to thermostat 106 and/or to some other device. Server 120 may also be coupled to weather server 112 to receive current and future weather information, in order to use such information to better control heating and cooling of an area inside structure 100, as described previously.

FIG. 2 is a perspective view of one embodiment of thermostat 106 showing a wave curve 200 during a heating cycle, comprising a short, gently-sloped beginning portion 218 transitioning to a moderately-sloped middle portion 220, which transitions into a short, gently sloped end portion 222, displayed on a graphical user interface 202. In a cooling cycle, wave curve 200 is generally horizontal inverted. The wave curve represents an expected, summarized thermal response of a heating or cooling cycle occurring or about to occur with respect to a particular setpoint and is used to visualize how quickly a desired setpoint temperature will be achieved, as well as, in some embodiments, conveying energy consumption information. The term "heating cycle" as used herein means a time that heating system 102 actively heats ambient air temperature inside structure 100 and may be activated automatically, i.e., via a setpoint, or manually, for example when a user manually enters a desired temperature via a user interface of thermostat 106 that is higher than the current ambient air temperature. Conversely, a "cooling cycle" as used herein means a time that cooling system 104 actively cools ambient air temperature inside structure 100 and may be activated automatically, i.e., via a setpoint, or manually, for example when a user manually enters a desired temperature via a user interface of thermostat 106 that is lower than the current ambient air temperature.

In this embodiment, wave curve 200 spans the entire width of graphical user interface 202, making it easy for users to see and understand how the indoor ambient temperature will change over time during an upcoming or present heating or cooling cycle. In one embodiment, the ambient temperature in proximity to thermostat 106 (or an average of two or more readings from temperature probes located in different rooms) is measured by thermostat 106 and displayed numerically, in one embodiment, on graphical user interface 202 as ambient temperature 204. Alternatively or in addition, ambient temperature 204 is represented at the far left point on wave curve 200. In one embodiment, graphical user interface 202 may display a series of graduations 212 and 214, with graduations 212 representing an ambient temperature and graduations 214 representing a setpoint temperature, in order for a user to quickly see at a glance what the relative ambient and setpoint temperatures are in relation to each other during a heating or cooling cycle.

A desired setpoint temperature 208, as defined by a particular setpoint, is represented graphically at a far right point 206 of wave curve 200 and may also be displayed numerically on graphical user interface 202 as desired setpoint temperature 210.

The shape of wave curve 200 is dependent on one or more factors, such as the current ambient temperature, the desired setpoint temperature, the heating or cooling capacity of heating system 102 or cooling system 104, current or future outdoor temperatures, results from previous heating and cooling cycles, and open/close status of any doors or windows. Wave curve 200 may comprise a gently-sloped area near far left point 204, indicating that it takes some time after a heating or cooling cycle begins before a change in room temperature occurs. Similarly, wave curve 200 may comprise a gently-sloped area near far right point 206 where heating system 102 or cooling system 104 may stop heating or cooling, as the case may be, as the ambient temperature approaches desired setpoint temperature 208, with the expected temperature rising more slowly as the desired setpoint temperature is reached.

The slope of wave curve 200 may depend on the type of heating system 102 or cooling system 104 controlled by thermostat 106. In some embodiments, heating system 102 and/or cooling system 104 may offer variable capacities. For example, heating system 102 and/or cooling system may offer a variable fan, two-stage heating or cooling, or comprise a variable refrigerant flow (VRF) system or a variable refrigerant volume (VRV) system. In this case, heating system 102 and/or cooling system 104 can provide rapid heating and/or cooling, generally at the expense of greater energy consumption, or an "economy" heating and/or cooling rate, generally saving energy vs. rapid heating/cooling but taking longer to reach desired setpoint temperatures. In one embodiment, in a variable heating/cooling environment, thermostat 106 can be placed into a "comfort" mode of operation, where thermostat 106 causes heating system 102 and/or cooling system 104 to operate at full or near-full capacity or an "economy" mode of operation, where thermostat 106 causes heating system 102 and/or cooling system 104 to operate at a reduced or minimal capacity. A user may select which mode to operate by selecting a comfort mode or an economy mode via a mode control icon or button 216 on graphical user interface 202. In another embodiment, the desired operating mode may be pre-programmed as part of one or more setpoints. In yet another embodiment, the operating mode may be automatically controlled by thermostat 106 when the difference between a current ambient temperature exceeds a desired setpoint temperature by a predetermined amount, such as 10 degrees.

In some embodiments, color may be used to convey certain information pertaining to the expected energy consumption rate of heating system 102 and/or cooling system 104 before or during heating or cooling cycles. For example, at some point prior to initiating a heating or cooling cycle in accordance with an upcoming setpoint, thermostat 106 may determine an expected energy consumption rate and then cause a portion of graphical user interface 202 to become colored, each color associated with an expected energy consumption rate of heating system 102 and/or cooling system 104 during an upcoming, or present, heating or cooling cycle.

Figures 3A, 3B:
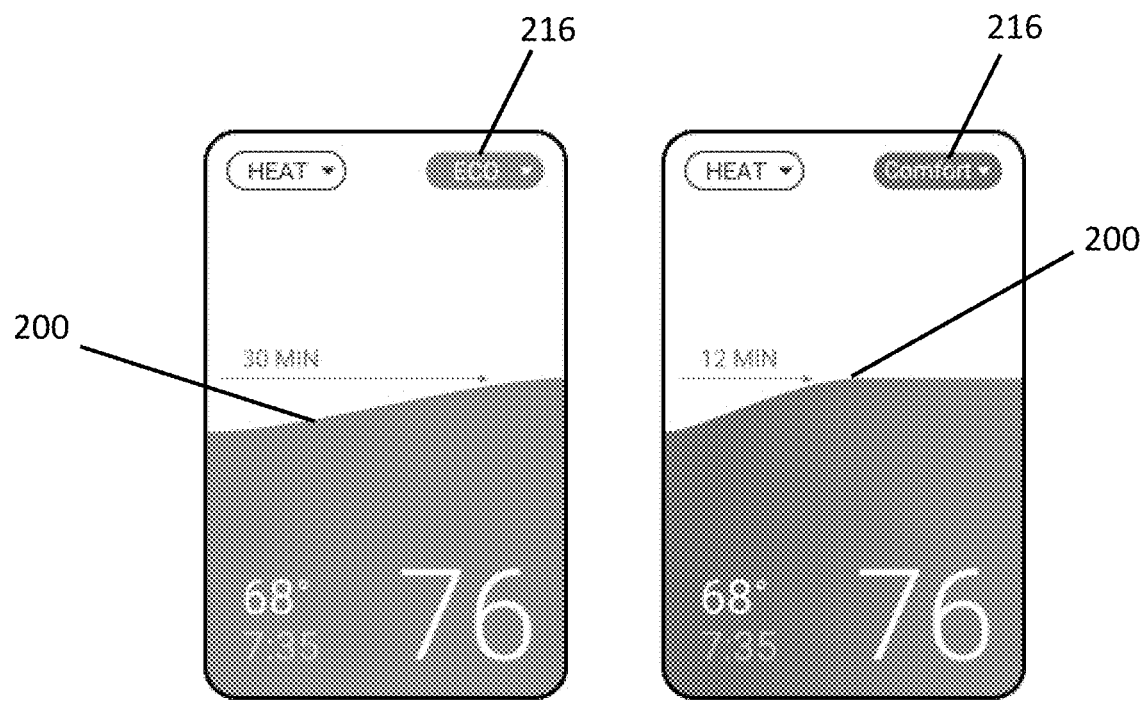
FIG. 3A illustrates a wave curve displayed on the thermostat as shown in FIGS. 1 and 2 when a heating cycle is or will become active, in the economy mode of operation.
FIG. 3B illustrates a wave curve displayed on the thermostat as shown in FIGS. 1 and 2 when a heating cycle is or will become active, in a comfort mode of operation.

FIG. 3A illustrates a wave curve 200 displayed on graphical user interface 202 of thermostat 106 when a heating cycle is or will become active, in the economy mode of operation. In the economy mode, wave curve 200 slopes gently to indicate that a desired setpoint temperature of 76 degrees will be achieved in approximately 30 minutes from an ambient temperature of 68 degrees. FIG. 3B illustrates a wave curve 200 displayed on graphical user interface 202 of thermostat 106 when a heating cycle is or will become active, in the comfort mode of operation. In the comfort mode, wave curve 200 slopes sharply and levels out relatively quickly to indicate that the desired setpoint temperature of 76 degrees will be achieved in approximately 12 minutes from an ambient temperature of 68 degrees. In some embodiments, a fixed time is represented by the width of graphical user interface 202, as in the example shown in FIGS. 3A and 3B, for example 30 minutes. In other embodiments, the relevant portions of wave curve 200 (i.e., the short, gently-sloped beginning portion 218, the sloped middle portion 220 and the short, gently-sloped end portion 222) are formatted to fit across the entire width of graphical user interface 202 (best shown in FIG. 2), no matter how long it takes to achieve the desired setpoint temperature. In this embodiment, the time represented by the width of graphical user interface 202 will vary in accordance with the time needed to achieve a desired setpoint temperature. For example, wave curves in the comfort mode will look similar to wave curves in an economy mode (assuming the same or similar starting ambient temperatures and desired setpoint temperatures), with the exception that the time represented by the width of graphical user interface 202 will be relatively shorter in the comfort mode and relatively longer in the economy mode.

Referring, now, back to the slope of wave curve 200, the slope may be affected by which operating mode is active as a heating or cooling cycle begins. For example, when the comfort mode of operation is active, the slope of wave curve 200 will be greater than when an economy mode of operation is active. In some embodiment, wave curve 200 may comprise two slopes, in a variable capacity heating/cooling system, where thermostat 106 may cause heating system 102 and/or cooling system 102 to heat or cool at a first, high capacity and then to heat or cool at a reduced capacity. In this way, a balance between energy consumption and rapidly achieving desired setpoint temperatures is achieved.

In one embodiment, a countdown timer may be employed by thermostat 106 to indicate to users a time remaining to achieve a desired setpoint temperature, shown in FIG. 2 as remaining time indicator 224 displayed on graphical user interface 202.

In another embodiment, an indicator 226 may be displayed on graphical user interface 202 to indicate a point in time during a heating or cooling cycle. While shown as a circular shape in FIG. 2, in other embodiments, indicator 226 may comprise other, geometric representations, or a vertical line. As a heating or cooling cycle begins, indicator 226 is shown at the far left portion of wave curve 200 and begins traveling along the wave curve as the heating or cooling cycle continues, finally reaching the far right portion of wave curve 200 as the heating or cooling cycle is completed.

FIGS. 4A-4D illustrate a front plan view of one embodiment of thermostat 106, illustrating the use of color to convey certain expected energy consumption rate information of heating system 102, while FIGS. 4E-4H illustrate a front plan view of one embodiment of thermostat 106, illustrating the use of color to convey certain expected energy consumption rate information of cooling system 104.

FIG. 4A illustrates thermostat 106 with wave curve 200 presented as shown. At this point in time, the ambient temperature is 68 degrees and a desired setpoint temperature is also 68 degrees. Hence, neither heating system 102 nor cooling system 104 are operating and, therefore, in this embodiment, thermostat 106 is colored green in an area of graphical user interface 202 underneath wave curve 200 to indicate minimal or zero energy consumption by heating system 102 and/or cooling system 104. The color green is represented by the particular striping shown in FIG. 4A. It should be understood that although the area underneath wave curve 200 is shaded in this example, different or additional areas of graphical user interface could be colored to indicate expected energy consumption rate information, i.e., shading the entire screen, coloring wave curve 200 only, shading above wave curve 200, etc. In this example, the color green is used to indicate minimal/no energy consumption, but another color could be chosen in the alternative.

FIG. 4B illustrates thermostat 106 with wave curve 200 showing a small, upward slope during a heating cycle (or before the heating cycle starts), with the ambient temperature at 68 degrees and a desired setpoint temperature at 72 degrees. Thermostat 106 may be set to economy mode, resulting in a reduced energy consumption of heating system 102, where heating system 102 comprises a variable capacity system. The expected rate of energy consumption is represented by shading underneath wave curve 200, this time in in orange, to reflect an increased rate of expected energy consumption over that from the steady-state condition illustrated by FIG. 4A. The color orange is represented by the particular striping shown in FIG. 4B, different than the striping as shown in FIG. 4A. As before, although the area underneath wave curve 200 is shaded in this example, different or additional areas of graphical user interface could be colored to indicate the increased, expected energy consumption rate, i.e., shading the entire screen, coloring wave curve 200 only, shading above wave curve 200, etc. In this example, the color orange is used to indicate a certain expected energy consumption rate greater than zero but less than a higher, expected energy consumption rate that may be experienced by placing thermostat 106 into the comfort mode of operation.

FIG. 4C illustrates thermostat 106 with wave curve 200 showing a sharp, upward slope during a heating cycle (or before the heating cycle starts), with the ambient temperature at 68 degrees and a desired setpoint temperature at 72 degrees. Thermostat 106 may be set to a comfort mode, resulting in an increased, or maximum, energy consumption rate of heating system 102 as compared to the expected energy consumption rate as depicted in FIG. 4B. The expected rate of energy consumption is represented by shading underneath wave curve 200, this time in in red, to reflect an increased, or maximum, rate of expected energy consumption over that from the consumption rates indicated in FIG. 4B. The color red is represented by the particular striping shown in FIG. 4C, different than the striping as shown in FIGS. 4A and 4B.

FIG. 4D illustrates thermostat 106 after the desired setpoint temperature has been reached, after a heating cycle has concluded. As in FIGS. 4A-4C, the area beneath wave curve 200 is shaded, this time green, to indicate that minimal, or no, energy is being consumed. The shading is represented by the same striping as shown in FIG. 4A.

FIGS. 4E-4H illustrate thermostat 106 displaying expected thermal responses during a cooling cycle. Generally, the responses shown in FIGS. 4E-4H are inverse to the responses shown in FIGS. 4A-4D, with the exception of the expected energy consumption rates, which are, again, shown in this example as shading beneath wave curve 200.

Figure 5:
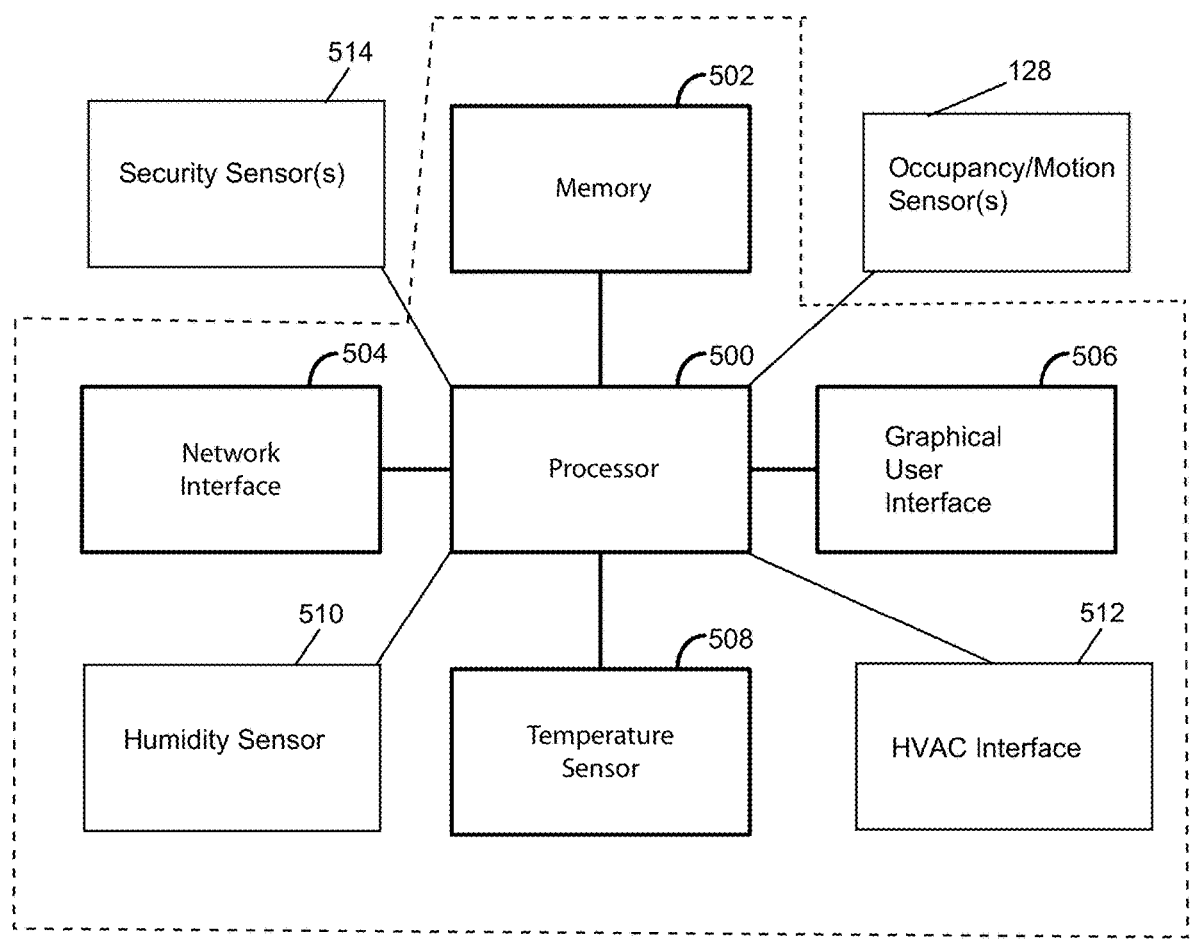
FIG. 5 is a functional block diagram of one embodiment of the thermostat as shown in FIGS. 1, 2 and 3.

FIG. 5 is a functional block diagram of one embodiment of thermostat 106, illustrating processor 500, memory 502, network interface 504, graphical user interface 506, temperature sensor 508, humidity sensor 510, and HVAC interface 512. In some embodiments, thermostat 106 may be electronically coupled to one or more security sensors, such as one or more door or window sensors and/or motion sensors, either through a dedicated, prior art receiver (not shown) or via network interface 504. It should be understood that in some embodiments, some functionality has been omitted from FIG. 5 for purposes of clarity, such as a power supply. It should be further understood that the functionality to calculate, summarize and present expected thermal responses could alternatively be performed by mobile device 122 or server 120, either alone or in connection with another device, such as a prior art thermostat.

Processor 500 comprises one or more general-purpose microprocessors, microcontrollers and/or custom or semi-custom ASICs, and/or discrete components able to carry out the functionality required for operation of thermostat 106. Processor 500 may be selected based on processing capabilities, power-consumption properties, and/or cost and size considerations. In the case of a microprocessor, microcontroller, or ASIC, processor 500 generally executes processor-executable instructions stored in memory 502 that control the functionality of the intelligent personal assistant. Examples of memory include one or more electronic memories such as RAM, ROM, hard drives, flash memory, EEPROMs, UVPROMs, etc. or virtually any other type of electronic, optical, or mechanical memory apparatus, but excludes propagated signals. In some embodiments, memory 502 may be incorporated into processor 500, such as in the case of a microcontroller having a certain amount of onboard static RAM, flash memory, or some other electronic memory capable of storing the processor-executable instructions and variable information, such as setpoint information, current and future weather information, door/window status information, past ramping historical information (i.e., previous ramp information and the conditions that produced the previous ramp information, such as indoor/outdoor temperatures, door/window status, occupancy information, etc.).

Network interface 504 comprises circuitry necessary to send and receive information to and from other devices in LAN 114, such as hub 118, door sensor 124, window sensor 126, mobile device 122, heating system 102, cooling system 104, occupancy sensors 128, and/or to entities outside LAN 114, such as weather server 112, server 120, and to mobile device 122 when mobile device 122 is outside LAN 114. Mobile device 122 comprises a smart phone, tablet computer, desktop computer, laptop computer, or other personal data apparatus executing an "app" for controlling thermostat 106, for entering setpoint information, for presenting expected thermal ramps graphically, etc.). Such network interface circuitry is well known in the art and may comprise one or more of BlueTooth, Wi-Fi, or RF circuitry, among others.

Graphical user interface 506 comprises an electronic display that allows a user to operate thermostat 106, (i.e., to program setpoints, to manually adjust temperature, etc.) to enter information that may be used by thermostat 106 (such as a location of structure 100, a square footage of structure 100, a capacity of heating system 102 and/or cooling system 104, security sensor information, etc.) and to display expected thermal responses as described with respect to FIG. 2 herein. Typically, graphical user interface 506 comprises a touch screen, widely used in most smart phones, thermostats and other electronic devices on the market today.

Temperature sensor 508 comprises a sensor that provides electronic signals to processor 500 in accordance with the ambient air temperature surrounding thermostat 106. In some embodiments, temperature sensor 508 is not used, and thermostat 106 receives temperature readings from one or more temperature sensors located in one or more locations inside structure 100. Temperature sensor 508 may comprise one of a thermistor, a resistive temperature detector, a thermocouple, semiconductor-type apparatus, or other temperature sensors known in the art.

Humidity sensor 510 comprises an optional electronic sensor that provides electronic signals to processor 500 in accordance with ambient humidity conditions surrounding thermostat 106. In some embodiments, humidity sensor 508 is not used, and thermostat 106 receives humidity readings from one or more humidity sensors located in one or more locations of structure 100. Humidity sensor 508 may comprise one of a capacitive sensor, a resistive sensor, a thermal sensor, a gravimetric sensor, an optical sensor, or some other humidity sensor known in the art.

HVAC interface 512 comprises circuitry to communicate with heating system 102 and/or cooling system 104. In one embodiment, HVAC interface 512 comprises well-known circuitry to communicate with systems 102 and 104 via two or more wires. In other embodiments, HVAC interface 512 comprises wireless radio frequency circuitry to communicate with system 102 and/or 104 wirelessly, such as popular Zwave® or Zigbee® communication chips. In yet still other embodiments, HVAC interface 512 is not needed, and thermostat 106 communicates with system 102 and/or 104 via network interface 404.

Security sensor(s) 514 comprise well-known door and window sensors, and/or motion sensors. Such sensors can determine when one or more doors or windows are open, which may impact the shape and ramp times of expected thermal responses. For example, if it is 40 degrees outside and a window is open, and thermostat is attempting to warm structure 100 to 72 degrees, it may take longer for heating system 102 to warm structure 100 to the desired setpoint temperature, as cold air from outside may enter structure 100 through the open window. The shape and ramp times of expected thermal responses could be further impacted if two or more doors or windows are open. Thermostat 106 may use status information of the security sensor(s), in combination with outdoor air temperatures, to calculate expected thermal responses.

Occupancy sensor(s) 128 comprise one or more prior art occupancy sensors, motion detectors, carbon monoxide detectors, cameras, or any other prior art device that can detect the presence of people inside structure 100. In one embodiment, thermostat 106 is capable of receiving wireless signals from the sensor(s) and using this information to generate or modify expected thermal responses. Generally, the more people inside structure 100 the more heat is generated by their bodies, warming the ambient air inside structure 100.

FIG. 6 is a flow diagram of one embodiment of a method, performed by thermostat 106, for calculating, summarizing and presenting expected thermal response visualizations. It should be understood that the steps described in this method could be performed in an order other than what is shown and discussed and that some minor method steps may have been omitted for clarity and simplicity. It should also be understood that the functionality described in this method may be performed by a thermostat, by a mobile device or by a server remotely located from a structure, and that reference to thermostat 106 can apply equally to these other devices.

At block 600, thermostat 106 is programmed by a user with one or more setpoints, typically via user interface 504 or mobile device 122. Each setpoint comprises a desired setpoint temperature (i.e., a desired room or building temperature) in connection with a day and a time that the user would like to achieve the desired setpoint temperature. Commonly-known setpoints comprise a wake setpoint, a leave setpoint, an arrive setpoint, and a sleep setpoint. Processor 500 receives the setpoints and stores them in memory 502.

A user may also enter information into thermostat 106 regarding structure 100 and heating system 102 and/or cooling system 104. Regarding structure 100, the user may enter the square footage of structure 100, a number of doors and/or windows, a location (i.e., zip code, GPS coordinates, area code, etc.), one or more materials that structure 100 is made from, a date that structure 100 was constructed, etc. Regarding heating system 102 and/or cooling system 104, the user may enter a capacity (i.e., killowatts, tons, BTU, etc.), one or more fan speeds, a brand name, model name, model number, etc.). Processor 500 receives the structure and heating/cooling system information and stores it in memory 502. In one embodiment, processor 500 may access a remote web server via network interface 504 to download energy consumption information of a particular model of heating system 102 and/or cooling system 104. Processor 500 then stores this information into memory 502.

Thermostat 106 may further be capable of storing indicia of doors and windows monitored by security sensors 514, for example, a front entry door monitored by a first security sensor 514 may be labeled "Front Door" and a window next to the front door monitored by a second security sensor 514 labeled "Window Near Front Door". Alternatively, or in combination, the indicia may comprise a photograph of at least some doors and windows monitored by security sensors 514, photographed by a user and provided to processor 500 for identifying doors and windows within structure 100.

Thermostat 106 may further be programmed to enter a number and type of security sensors and/or occupancy sensors.

At block 602, processor 500 may receive current weather conditions from weather server 112. In another embodiment, current weather conditions may be received from a local temperature sensor installed outside of structure 100 and in communication with local-area network 114. In any case, processor 500 receives current weather conditions and typically stores the current weather conditions in memory 502. Such current weather conditions comprise temperature, barometric pressure, wind direction and/or speed, precipitation indications, and/or cloud coverage indications.

At block 604, processor 500 may receive future weather forecasts from weather server 112. Such future weather forecasts may comprise predicted temperatures barometric pressures, wind directions and/or speed, precipitation indications, and/or cloud coverage indications. Such future weather information may be provided as an hourly or daily forecast, extending into the future a number of days, such as ten days. For each time period (hour or day), predicted weather information may be provided by weather server 112, as weather predictions are generated by weather server 112. In one embodiment, one or more weather prediction updates are provided to processor 500 at predetermined time intervals, such as one hour or one day. In other embodiments, weather predictions are provided to processor 500 upon processor 500 requesting such weather prediction information from server 112 at predetermined time intervals, or upon the occurrence of a predetermined event, such as a user requesting an update via graphical user interface 506 or mobile device 122.

At block 606, processor 500 may calculate one or more expected thermal responses in connection with one or more of the setpoints stored in memory 502, based on one or more factors, as discussed below. In some embodiments, expected thermal responses are calculated shortly before each setpoint time is reached, or a time that heating system 102 or cooling system 104 begins a temperature ramp, i.e., approximately 15 minutes prior to each setpoint time. For example, if a "wake" setpoint is set for 7 am, processor 500 may calculate an expected thermal response, for that setpoint only, at about 20 minutes before 7 am (i.e., 5 minutes before heating system 102 or cooling system 104 begins a heating or cooling cycle, respectively), and similarly calculate expected thermal responses for other setpoints just before their setpoint times, respectively. Processor 500 may additionally calculate an expected thermal response in response to receiving manual input from a user to manually change the current ambient air temperature, or to change the desired setpoint temperature during a heating or cooling cycle. In these cases, processor 500 uses the current ambient temperature as starting point of an expected thermal response and the desired temperature as entered by the user to generate an expected thermal ramp. Processor 500 may generate a new expected thermal ramp each time a user enters a new desired temperature. For example, if the ambient air temperature is 78 degrees, and the use desires 72 degrees, the user may touch a portion of graphical user interface 506 representing a decrease in air temperature, one degree at a time. As the user presses once, causing the desired temperature to fall to 77 degrees, processor 500 may generate and display an expected thermal response, using the current ambient air temperature of 78 degrees as a starting point of the expected thermal response and using 77 degrees as an end point of the expected thermal response. As the user continues to modify the desired temperature, pressing once for each decrease in desired temperature, processor 500 re-calculates an expected thermal response, using the current ambient air temperature as a start point and using the just-entered temperature by the user. The user may enter the desired temperature in just a few seconds by, in this case, six touches of graphical user interface 506, so that one of six different expected thermal responses will be calculated, simplified and displayed as the user touches graphical user interface 506 each time, respectively.

In one embodiment, expected thermal ramps are calculated using the ambient temperature in proximity to thermostat 106 (and/or one or more thermal sensors coupled to thermostat 106) at or before the start of each thermal ramp, and the desired setpoint temperature of each setpoint. In this case, in one embodiment, processor 500 calculates a series of expected temperatures over time during a heating or cooling cycle, i.e., between the time that a thermal ramp begins and an expected time that the setpoint temperature is reached. It should be understood that a thermal ramp may begin prior to a setpoint time being reached, in order to allow time for heating system 102 and/or cooling system 104 to attain the desired setpoint temperature by the setpoint time. This time may be referred to herein as a thermal ramp start time, typically equal to about between 10-20 minutes.

The calculation performed by processor 500, in the case described above, may comprise determining a series of expected temperatures linearly from the ambient temperature to the desired setpoint temperature. In some embodiments, only the ambient temperature and the desired setpoint temperatures are used as criteria for processor 500 to calculate the expected thermal response, which is simplified and displayed as a "wave curve" on graphical user interface 506, in this case, a straight line from the ambient temperature to the desired setpoint temperature. In a related embodiment, processor 500 may modify the straight line by adding "default", gently-sloped portions to the beginning and end portions of the straight line, similar to beginning portion 218 and end portion 222. These additions to the straight line may be stored in memory 502 and appended to the straight line as an approximation of how the ambient temperature may change at the beginning and/or end of a heating and/or cooling cycle.

In one embodiment, processor 500 utilizes the capacity of heating system 102 and/or cooling system 104, along with the ambient temperature and setpoint temperature, to calculate expected thermal responses. In this embodiment, the capacity of heating system 102 and/or cooling system is retrieved from memory 502 and used to help calculate expected temperatures vs. time using the ambient temperature, the desired setpoint temperature and the capacity information. For example, if the capacity of heating system 102 is 150,000 BTU, which may be considered to be a very large heating capacity, processor 500 may calculate expected temperatures vs. time that quickly ramp from the ambient temperature to the desired setpoint temperature, for example, 10 minutes. On the other hand, if the capacity of heating system 102 is only 50,000 BTU, this may be considered a small heating system, and processor 500 may calculate expected temperatures vs. time that much more slowly ramp from the ambient temperature to the desired setpoint temperature, for example, given the same ambient temperature and setpoint temperature is in the previous example, 30 minutes. Of course, calculation of the temperatures vs. time during each thermal ramp is dependent, in part, on the difference between the ambient temperature and the setpoint temperature. The greater the difference, the longer it will take heating system 102 or cooling system 104 to attain the setpoint temperature.

In a related embodiment, memory 502 stores one or more characteristics of structure 100 to better calculate expected thermal responses. For example, memory 502 could store characteristics such as square footage, ceiling heights, number of floors, insulation type, number of windows, a location of structure 100, sun exposure, and number of occupants, received by manual entry via graphical user interface 506 or mobile device 122. Characteristics that tend to speed up heating or cooling cycles include smaller square footages, lower ceiling heights, one-floor construction, better insulation, a small number of windows, a location of structure 100 in warmer/cooler climates, low/high sun exposure and fewer occupants, and versa. Thus, if a particular cooling cycle, for example, begins at an ambient temperature of 80 degrees with a setpoint temperature of 72 degrees, the time to cool an area inside structure 100 to 72 degrees, where structure 100 comprises one or more of the aforementioned characteristics that tend to speed up heating and cooling cycles will be less than the time to cool an area inside structure 100 comprising one or more of the aforementioned characteristics that tend to slow down heating and cooling cycles.

In one embodiment, processor 500 utilizes current or future outdoor weather, along with the ambient indoor temperature and setpoint temperature, to calculate, or modify one or more existing, expected thermal responses. Such current or future outdoor weather may comprise one or more current and/or future outdoor temperatures, precipitation, wind speed and direction, cloud coverage, and other current and future weather-related information. Generally, processor 500 will use the current outdoor weather information to calculate expected thermal responses of a setpoint that is about to occur. In other embodiments, processor 500 uses predicted outdoor temperatures to calculate expected thermal responses for setpoints that will occur in the future, using the predicted outdoor temperature at the time when a future setpoint begins. For example, if the current outdoor temperature is 30 degrees, and a wake setpoint will occur in 1 minute, with an ambient indoor temperature of 63 degrees and a desired setpoint temperature of 70 degrees, processor 500 may calculate a thermal response for this setpoint that indicates the indoor, ambient temperature rising more slowly than if the outdoor temperature was 50 degrees.

In one embodiment, processor 500 utilizes results from previous thermal ramps, along with the ambient indoor temperature and setpoint temperature, to calculate expected thermal responses. In this embodiment, processor 500 stores sets of ambient indoor temperatures over time during heating or cooling cycles in memory 502, obtained from temperature sensor 508, for example, one temperature reading per minute. Other information may be stored in association with each heating/cooling cycle as well, such as humidity, door or window status (i.e., open or closed), and/or weather conditions during each heating/cooling cycle. In some embodiments, the rate at which temperature readings are stored in memory 502 may be greater near the beginning and end of a heating or cooling cycle, in order to get a better idea of how the temperature is changing during a non-linear portion of a heating or cooling cycle. For example, when heating system 102 begins heating an area inside structure 100, little or no change in the ambient temperature may be detected for the first few minutes, as warm air from heating system 102 begins to displace cooler ambient air in an area inside structure 100. During this time, processor 500 may store ambient indoor temperatures at a rate of one reading every 30 seconds in order to capture the nuanced temperature differences as the ambient temperature begins to respond to the heating cycle. Then, once the cool ambient air has been replaced by warm air from heater 102, the ambient air begins to heat generally linearly, i.e., at more or less of a constant rate. During this time, processor 500 may store ambient indoor temperatures at a rate of one reading every 60 seconds. Likewise, near the end of the heating cycle, i.e., when the ambient indoor temperature approaches the desired setpoint temperature, heating system 102 may shut off its heating element and allow the ambient indoor temperature to "ease" into the desired setpoint temperature at a rate more slowly than in the linear portion of the heating cycle. During this time, processor 500 may again store ambient indoor temperatures at a rate of one reading every 30 seconds, in order to capture the nuanced temperature differences as the ambient temperature approaches the setpoint temperature.

For any setpoint, processor 500 may compare the current ambient indoor temperature and the desired setpoint temperature to the stored ambient indoor temperatures and related setpoints to determine a best match to the current ambient indoor temperature and desired setpoint temperature. For example, if the current ambient indoor temperature is 82 degrees and a desired setpoint temperature is 72 degrees, processor 500 may determine a best match of a previous cooling cycle that began at an ambient temperature of 82 degrees had having a desired setpoint temperature of 72 degrees. If an exact match is not found, processor 500 may place more weight on either the ambient temperature, or the desired setpoint temperature in order to obtain a best match. For example, if no data is available in memory 502 for an ambient indoor temperature of 82 degrees with a desired setpoint temperature of 72 degrees, processor 500 may determine a best match of previously stored data having a starting ambient indoor temperature of 70 degrees with a desired setpoint temperature of 72 degrees. In another embodiment, processor 500 determines a best match by comparing a temperature difference between the current ambient indoor temperature and the desired setpoint temperature to the temperature difference of each pair of starting ambient temperatures and associated desired setpoint temperatures stored in memory 502. The starting ambient temperature and desired setpoint temperatures stored in memory 502 having the closest differential to the current ambient temperature and desired setpoint temperature may be considered by processor 500 to be the closest match. In some embodiments, this method is not considered by processor 500 when either the current ambient indoor temperature and/or the desired setpoint temperature is more than a predetermined number of degrees outside of stored ambient temperatures and associated desired setpoint temperatures, respectively.

In some embodiments, processor 500 uses other information stored in association with the ambient indoor temperatures and desired setpoint temperatures to determine a best match. For example, memory 502 may store two previous thermal ramps, each beginning at an ambient indoor temperature of 64 degrees and each having a desired setpoint temperature of 72 degrees. However, one of these ramps was recorded while a window was open (as determined by a security sensor 514), featuring a relatively gentle ambient temperature gradient, due to some of the heat from heating system 102 escaping out of the open window, and the other ramp recorded while all doors and windows were shut, resulting in an a steeper ambient temperature thermal gradient, due to all of the heat from heating system 102 remaining inside structure 102. In this example, processor 500 determines that the current ambient indoor temperature is 64 degrees, that the desired setpoint temperature is 72 degrees, and that a window is open. Thus, processor 500 selects the previously-stored thermal ramp information stored in memory 202 that matches the 64 degree ambient indoor temperature, the 72 degree desired setpoint temperature and the fact that a window is open. Of course, processor 500 could select a previously-stored thermal ramp using one or more other informational elements stored in memory 502, either additionally or in alternatively, such as humidity and/or weather conditions to select a best match of previously-stored thermal ramp information.

Figure 7A:
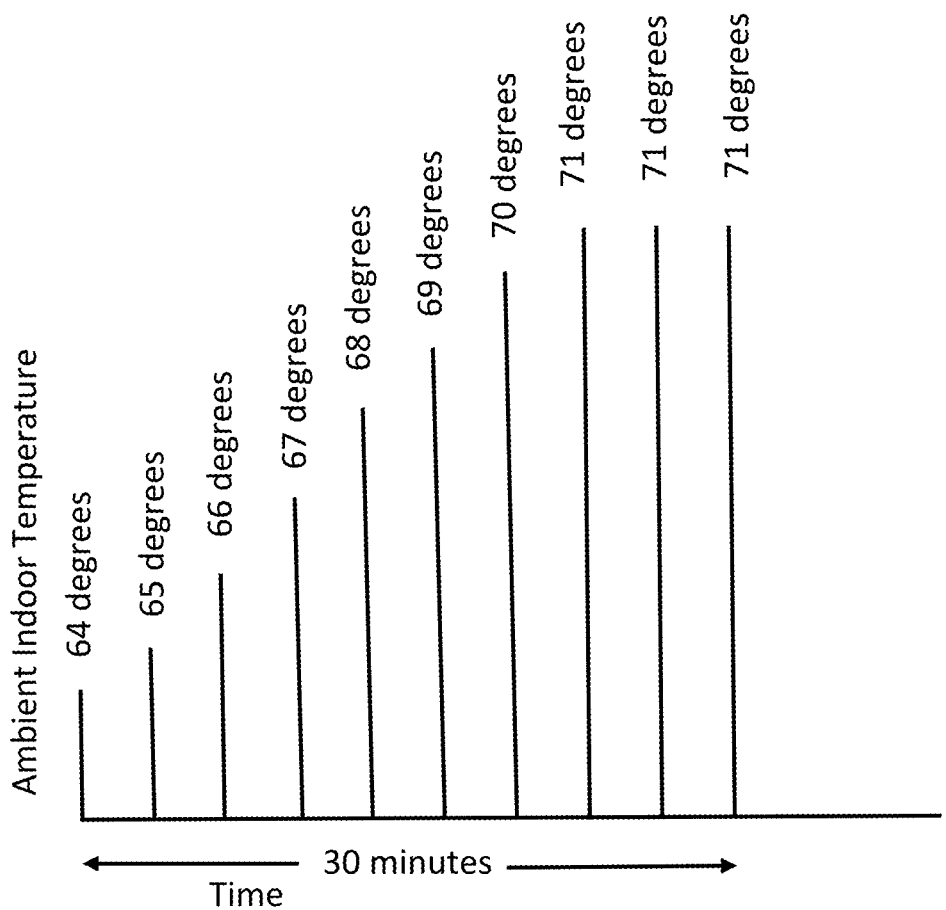
FIG. 7A is a graph illustrating an expected thermal response of a setpoint comprising a series of expected temperatures over time.
Figure 7B:
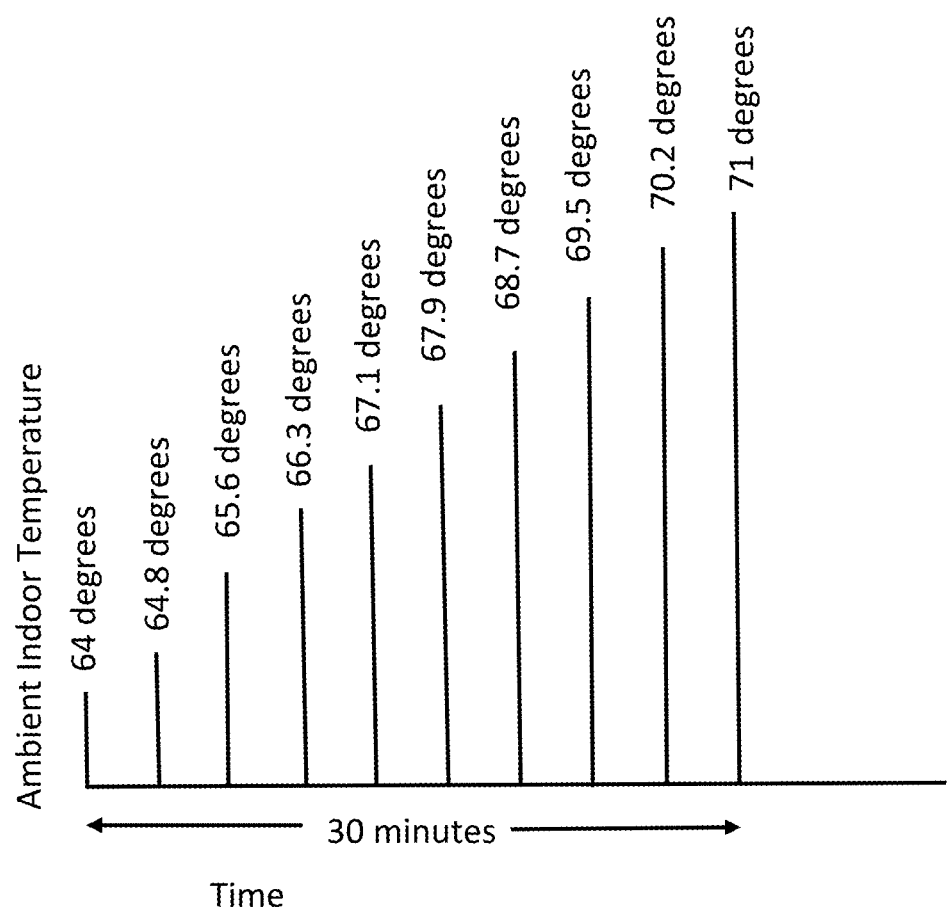
FIG. 7B is a graph illustrating a modified, expected thermal response of the same setpoint of FIG. 7A, but with one or more doors or windows determined to be open.

After processor 500 determines a best match of the current ambient indoor temperature and desired setpoint temperature in memory 502, processor 500 uses the actual, stored temperature readings associated with the selected, stored ambient indoor temperature and associated desired setpoint temperature as a basis of a current, expected thermal response associated with an upcoming setpoint. Some or all of these temperatures may be modified by processor 500 based on other factors, such as current/expected humidity conditions, current status of any doors or windows (i.e., open or closed), current or future weather conditions, etc. For example, if the best match in memory 502 for a starting ambient indoor temperature of 64 degrees and a desired setpoint temperature of 71 degrees comprises the temperature readings as shown in FIG. 7A, where the desired setpoint temperature is achieved in about 20 minutes, processor may modify some of these temperatures to indicate, for example, a longer heating cycle if one or more doors or window are open, as shown in FIG. 7B, where the temperature gradient ramps more slowly and takes longer, 30 minutes in this example, to achieve the desired setpoint temperature of 71 degrees. In an alternative embodiment, processor 500 may store ambient indoor temperatures during thermal ramps only until reaching a desired setpoint temperature. In other words, FIG. 7A, only the first eight ambient temperatures would be recorded.

In one embodiment, processor 500 utilizes an open or closed status of one or more doors and windows of structure 100, along with the ambient indoor temperature and desired setpoint temperature, to calculate, or modify one or more existing, expected thermal responses. Generally, any open door or window during a heating or cooling cycle tends to reduce the efficiency of the cycle, resulting in longer times to achieve the desired setpoint temperature. In this embodiment, processor 500 may calculate an expected thermal response based on any of the foregoing methods (i.e., linear, modified linear, system capacity-based, outdoor temperature compensation, previous thermal responses) and increase the time needed for heating or cooling at a first predetermined amount for each door or window that is open during a heating or cooling cycle. For example, if it takes 20 minutes for cooling system 104 to cool an area inside structure 100 from 80 degrees to 70 degrees with all doors and windows closed, processor 500 may increase the time needed to achieve the desired setpoint temperature to 25 minutes if one door or window is open, 30 minutes if two doors or windows are open, etc. In some embodiments, some of the doors and windows may be given a higher weight to alter the heating/cooling times when they are located next to air vents, or if they are denoted as "large" by a user.

In one embodiment, processor 500 uses a current state of occupancy of one or more areas inside structure 100, along with the ambient indoor temperature and desired setpoint temperature, to calculate, or modify one or more existing, expected thermal responses. In this embodiment, processor 500 receives occupancy signals from one or more occupancy sensors 128, either via network interface 504 or a dedicated, prior art receiver of thermostat 106. For an upcoming heating setpoint, processor 500 generally reduces the time necessary to bring an area inside structure 100 to the desired setpoint temperature when structure 100 is occupied by one or more people. The more people, the faster the expected thermal response, as each person emits heat from their body, contributing to a warming of the ambient air inside structure 100. Alternatively, for an upcoming cooling cycle, processor 500 generally increases the time necessary to bring an area inside structure 100 to the desired setpoint temperature when structure 100 is occupied by one or more people. The effect of body heat inside structure 100 generally becomes more pronounced as more and more people are inside structure 100, and this effect may not be linear, and may further be dependent on the size of structure 100. For example, if structure 100 is 800 square feet, the ambient indoor temperature will be little changed when one or two people or present, but may be impacted to a modest extent when four people are present, and largely impacted when 10 or more people are present. However, in a large structure, such as 3,000 square feet, the ambient temperature inside structure 100 may not begin to be affected until 10 people are present. In one embodiment, processor 500 generates or modifies one or more expected thermal responses based on information stored in memory 502. For example, processor 500 may increase, or decrease, the expected thermal response (i.e., the time it takes for an area inside structure 100 to achieve a desired setpoint temperature) as each new person arrives, or leaves, structure 100. In one embodiment, this is achieved by storing a numeric factor in memory 502 for a number of people that may occupy structure 100. For example, the factor may be "1" (i.e., no change) when 1-3 people are detected inside structure 100, 1.2 if 4-6 people are present, and 1.5 if 7-10 people are present. The factor influences the expected thermal response by increasing, by a multiplication of the expected thermal ramp time by the factor, the expected thermal ramp time, during cooling cycles and decreasing, by dividing the expected thermal ramp time by the factor, the expected thermal ramp time, during heating cycles.

In one embodiment, the expected thermal response visualization additionally comprises a visual indication of the expected energy consumption of heater 102 and/or cooling system 104 before, or while, heating system 102 or cooling system 104 is operating to heat or cool an area inside structure 100, respectively. A color may be indicative of a particular amount of power consumption, i.e., red to indicate high power consumption and green to indicate a lower power consumption. In one embodiment, processor 500 changes the color representative of the energy consumption if processor 500 receives one or more manual indications from graphical user interface 506 to increase the temperature (to achieve heating) or decrease the temperature (to achieve cooling). Such manual input may be received as a user desires the ambient air temperature inside structure 100 to heat or cool beyond what is currently programmed. For example, if the ambient air temperature is 72 degrees and the user presses graphical user interface six times to enter a desired temperature of 78 degrees, for each press of graphical user interface 506, processor 500 may calculate a new color to display, based on the expected energy consumption to achieve the temperature indicated by the user. A color change may happen upon each press of graphical user interface 506, or it may occur only when a predetermined temperature change threshold is reached, i.e., processor 500 changes the color of at least a portion of graphical user interface 506 for ever two degrees of change from the current ambient temperature.

Processor 500 may select a color for display by considering energy ratings of heating system 102 and/or cooling system 104 and the expected time to achieve a particular setpoint. For example, more energy will be used during a heating/cooling cycle when the difference between the ambient temperature and desired temperate is large, as opposed to less energy when the difference is smaller. Of course, other factors may come into play, such as the size of structure 100, the number of doors/windows and whether they are open or closed, the number of people present, etc. Processor 500 may store a plurality of expected energy consumption in memory 502 in association with a particular color, where each expected energy consumption corresponds to a particular starting ambient temperature and desired temperature combination, the expected energy consumption the expected energy consumption of heating system 102 or cooling system 104 to heat or cool the ambient air within structure 100 to the desired temperature. In another embodiment, the differences between a plurality of starting/desired temperatures are stored, each with a corresponding different color to represent the energy consumption required to raise or lower the ambient air temperature within structure 100. Then, during generation of an expected thermal response, processor 500 determines the starting ambient air temperature and desired temperature and references memory 502 to select a color based on either the start/desired temperatures of an upcoming heating or cooling cycle or based on the difference in start/desired temperatures. The colors displayed on graphical user interface 506 may comprise a plurality of colors, ranging from, for example, green, indicating low/no energy consumption, to yellow (increased energy consumption, to orange (still more energy consumption) to red (maximum energy consumption). Of course, other color schemes can be used and the number of colors could be larger or smaller than the four just discussed.

At block 608, in one embodiment, processor 500 may generate a message to a user of thermostat 106 to perform one or more actions, either prior to, or during, a heating or cooling cycle, to more efficiently and expeditiously heating or cooling an area inside structure 100. For example, just prior to a heating cycle, processor 500 may determine that one or more doors or windows are open from signals received from one or more security sensors 514. In response, processor may generate a suggestion to "close all doors and windows" or more specifically, "close window near front door" in a case where thermostat 106 has been preprogrammed with indicia of at least some doors and windows monitored by security sensors 514. The message may be displayed on graphical user interface 202 and/or transmitted to mobile device 122, where mobile device 122 causes the message to be displayed to a user, for example, in the form of a text message.

At block 610, processor 500 may receive an indication from one or more of the security sensors 514 that a user has closed one or more of the open doors or windows and may generate and display a message such as "Thank you!". Alternatively or in addition, processor 500 may calculate a new, estimated thermal response based on the knowledge that the user has closed one or more open doors and windows. For example, a current expected thermal response might change from having a slope of $\frac{1}{5}^{th}$ to a slope of $\frac{1}{4}^{th}$, or the slope remains unchanged, but the time to achieve the desired setpoint temperature is shortened.

At block 612, in one embodiment, processor may generate one or more blind control signals to cause one or more window blinds to close prior to, or during, a cooling cycle. In this embodiment, some of the windows of structure 100 may be outfitted with motorized blinds, such as Insynctive® brand of motorized blinds sold by Pella Corporation of Pella, Iowa. The motorized blinds are typically controlled by either a dedicated remote control, or via a specialized app running on mobile device 122, and often wireless control signals are routed to such motorized blinds via LAN 114. Processor 500 may be provided an open/close status of one or more motorized blinds via LAN 114 and network interface 504. If processor 500 determines that one or more motorized blinds are open prior to, or during, a cooling cycle, processor 500 may cause one or more of the blind control signals to be transmitted to the one or more blinds, the blind control signs(s) instructing each motorized blind to close. In one embodiment, processor 500 only sends one or more blind control signals when thermostat 106 is operating in an economy mode of operation. As described in a similar embodiment, in response to transmitting the blind control signal(s), or upon receiving confirmation from the one or more motorized blinds that each blind has actually been closed, processor 500 may calculate a new, estimated thermal response based on the knowledge that one or more blinds have been closed.

At block 614, processor 500 may calculate, or modify, an expected thermal response based on whether thermostat 106 is in an "economy" mode of operation or a "comfort" or "boost" mode of operation. Processor 500 determines which mode to operate under upon receiving a signal from mode control icon or button 216. In the economy mode, thermostat 106 instructs heating system 102 and/or cooling system 104 to operate in an efficient way, i.e., running a fan at a low speed, operating a first stage of a two-stage heating or cooling system, reducing a refrigerant flow in a variable refrigerant flow cooling system, or other techniques well-known in the art to operate heating system 102 and/or cooling system 104 in a power-efficient mode of operation. In the comfort mode, processor 500 instructs heating system 102 and/or cooling system 104 to operate at full capacity to heat or cool an area inside structure 100 as quickly as possible. In any case, processor 500 calculates an expected thermal response that takes longer to achieve the desired setpoint temperature in the economy mode than in the comfort mode, all other things being equal.

At block 616, after processor 500 has calculated one or more expected thermal responses as described above, processor 500 simplifies one or more of the expected thermal responses by converting the expected thermal responses into one or more graphical representations, herein referred to as expected thermal response visualizations. In one embodiment, processor 500 uses the individual expected temperatures vs. times and converts them into a graphical format. For example, if an expected thermal response comprises 10 temperatures decreasing at a steady rate, processor 500 converts those values into a straight line, beginning at an ambient temperature and ending at a desired setpoint temperature. In general, in one embodiment, the expected thermal response visualizations comprise a line graph or "wave curve". Alternatively, the graphical format could take other forms, such as a bar graph or some other form. In some embodiments, the wave curve spans an entire width of graphical user interface 506, representing a fixed time period, such as 10-30 minutes, graphically displaying a current ambient temperature at a far left side of graphical user interface 506 and graphically displaying a desired setpoint temperature on a right side of graphical user interface 500. In other embodiments, the wave curve is fitted so that it fits entirely within the width of graphical user interface 500, i.e., the displayed width of the wave curve may indicate different time durations. In one embodiment, the expected thermal response comprises merely a starting ambient temperature and a desired setpoint temperature, and the expected thermal response visualization comprises a line from the starting ambient temperature to the desired setpoint temperature. In general, processor 500 approximates the expected temperatures vs. time by generating a line graph that best approximates the expected temperatures during a thermal ramp.

At block 618, processor 500 causes graphical user interface 506 to display the expected thermal response visualization before, or during, a thermal ramp. In some embodiments, alternatively or additionally, processor 500 sends the expected thermal response visualization to at least one device external to thermostat 106, typically via LAN 114 for viewing the expected thermal response visualization remotely from thermostat 106.

At block 620, processor 500 may generate indicator 226 and cause indicator 226 to be displayed on graphical user interface 202 as part of the expected thermal response visualization. Indicator 226 provides a graphical representation of the current ambient temperature as it is rendered, in one embodiment, along wave curve 200. Processor 500 determines a current ambient temperature and then renders indicator 226 at a point along wave curve 200 that matches the current ambient temperature.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. An apparatus for summarizing and conveying expected thermal responses to users, comprising:
    a graphical user interface;
    a temperature sensor;
    a non-transient memory for storing processor-executable instructions and one or more setpoints; and
    a processor, coupled to the graphical user interface, the temperature sensor and the non-transient memory for executing the processor-executable instructions that causes the processor to:
    store a first setpoint in the memory, the first setpoint comprising a start time and a desired setpoint temperature;
    determine a current ambient temperature of a room based on one or more signals from the temperature sensor;
    calculate an expected thermal response based on at least the current ambient temperature and the desired setpoint temperature;
    summarize the expected thermal response into an expected thermal response graph visualization;
    cause the expected thermal response graph visualization to be displayed on the graphical user interface;
    determine a plurality of expected energy consumption rates of the HVAC system, each of the plurality of expected energy consumption rates determined at least in part on a baseline ambient temperature at a start of a heating or cooling cycle and/or a desired setpoint temperature;
    assign a color to each expected energy consumption rate;
    store the plurality of expected energy consumption rates in the memory in association with its assigned color;
    identify a one of the plurality of expected energy consumption rates stored in the memory based on the current ambient temperature and the first setpoint; and
    shade the area below the expected thermal response graph visualization with the color assigned to the identified one of the plurality of expected energy consumption rate;
    wherein the expected thermal response graph visualization comprises a wave curve of expected room temperatures vs. time, having a y-axis on which temperature is depicted and an x-axis on which time is depicted, and the wave curve is caused to be displayed using an entire width of the graphical user interface.

2. The apparatus of claim 1, further comprising a network interface and further comprising further processor-executable instructions that causes the processor to:
    initiate a cooling sequence with HVAC equipment coupled to the apparatus based on a current temperature provided by the temperature sensor and one of the one or more setpoints; and
    in response to initiating the cooling sequence, send a blind control signal to the network interface, the blind control signal for causing motorized blinds, coupled to the apparatus via the network interface, to close.

3. The apparatus of claim 2, wherein the processor-executable instructions that cause the processor to send a blind control signal comprises instructions that causes the processor to:
    send the blind control signal only when the processor determines that the apparatus is operating in an economy mode.

4. The apparatus of claim 1, further comprising a network interface and further comprising further processor-executable instructions that causes the processor to:

determine that a cooling sequence or a heating sequence will occur;

in response to determining that a cooling sequence or a heating sequence will occur, cause a message to be displayed on the graphical user interface asking a user to close any open doors or windows for faster and more efficient heating or cooling.

5. The apparatus of claim 1, further comprising further processor-executable instructions that causes the processor to:

modify the expected thermal response based on whether the apparatus is operating in an economy mode of operation or not.

6. A method for summarizing and conveying expected thermal responses to users, comprising:

storing a first setpoint in a memory, the first setpoint comprising a start time and a desired setpoint temperature;

determining a current ambient temperature of a room based on one or more signals from a temperature sensor;

calculating an expected thermal response based on at least the current ambient temperature and the desired setpoint temperature;

summarizing the expected thermal response into an expected thermal response graph visualization; and causing the expected thermal response graph visualization to be displayed on the graphical user interface;

determining a plurality of expected energy consumption rates of the HVAC system, each of the plurality of expected energy consumption rates determined at least in part on a baseline ambient temperature at a start of a heating or cooling cycle and/or a desired setpoint temperature;

assigning a color to each expected energy consumption rate;

storing the plurality of expected energy consumption rates in the memory in association with its assigned color;

identifying a one of the plurality of expected energy consumption rates stored in the memory based on the current ambient temperature and the first setpoint; and shading the area below the expected thermal response graph visualization with the color assigned to the identified one of the plurality of expected energy consumption rate;

wherein the expected thermal response graph visualization comprises a wave curve of expected room temperatures vs. time, having a y-axis on which temperature is depicted and an x-axis on which time is depicted, and the wave curve is caused to be displayed using an entire width of the graphical user interface.

7. The method of claim 6, further comprising:

initiating a cooling sequence with HVAC equipment coupled to the apparatus based on a current temperature provided by the temperature sensor and one of the one or more setpoints; and in response to initiating the cooling sequence, sending a blind control signal to a motorized blind, the blind control signal for causing the motorized blind to close.

8. The method of claim 7, wherein sending a blind control signal comprises:

sending the blind control signal only when operating in an economy mode.

9. The method of claim 6, further comprising:

determining that a cooling sequence or a heating sequence will occur;

in response to determining that a cooling sequence or a heating sequence will occur, causing a message to be displayed on a graphical user interface asking a user to close any open doors or windows for faster and more efficient heating or cooling.

10. The method of claim 6, further comprising:

modifying the expected thermal response based on whether an economy mode of operation is in effect or not.

* * * * *